United States Patent [19]

Wong et al.

[11] Patent Number: 4,831,850
[45] Date of Patent: May 23, 1989

[54] APPARATUS FOR PROTECTING A CONSOLE GEARSHIFT AND PREVENTING THEFT OF A RADIO IN A MOTOR VEHICLE

[76] Inventors: Michael Wong; Hon T. Yu, both of 143-11 Quince Ave., Flushing, N.Y. 11355

[21] Appl. No.: 199,204

[22] Filed: May 26, 1988

[51] Int. Cl.⁴ .............................................. B60R 25/00
[52] U.S. Cl. ..................................... 70/202; 180/287; 70/237; 70/247; 70/258
[58] Field of Search ................. 180/287; 70/237, 238, 70/247, 258, 58, 202, 245, 246

[56] References Cited

U.S. PATENT DOCUMENTS 4,759,424  7/1988  Rolleri ................................. 280/287

Primary Examiner—Charles A. Marmor
Assistant Examiner—Karin Ferriter
Attorney, Agent, or Firm—Michael I. Kroll

[57] ABSTRACT

An apparatus for protecting a console gearshift and preventing theft of a radio in a motor vehicle is provided and consists of a housing disposed over the console gearshift so that button on the console gearshift cannot be depressed to release the console gearshift out of a parked position, thus preventing an unauthorized person from driving the motor vehicle away. A C-shaped bracket is mounted to the housing for blocking the radio so as to prevent an unauthorized removal of the radio from the motor vehicle.

4 Claims, 1 Drawing Sheet

APPARATUS FOR PROTECTING A CONSOLE GEARSHIFT AND PREVENTING THEFT OF A RADIO IN A MOTOR VEHICLE

BACKGROUND OF THE INVENTION

1. Field of the Invention

The instant invention relates generally to security devices and more specifically it relates to an apparatus for protecting a console gearshift and preventing theft of a radio in a motor vehicle.

2. Description of the Prior Art

Numerous security devices have been provided in prior art that are adapted to prevent the theft of various articles by utilizing a locking system for the articles. While these units may be suitable for the particular purpose to which they address, they would not be as suitable for the purposes of the present invention as hereinafter described.

SUMMARY OF THE INVENTION

A primary object of the present invention is to provide an apparatus for protecting a console gearshift and preventing theft of a radio in a motor vehicle that will overcome the shortcomings of the prior art devices.

Another object is to provide an apparatus for protecting a console gearshift and preventing theft of a radio in a motor vehicle in which the apparatus is disposed over the console gearshift so that button on the console gearshift cannot be depressed to release the console gearshift out of the parked position, thus preventing the theft of the motor vehicle.

An additional object is to provide an apparatus for protecting a console gearshift and preventing theft of a radio in a motor vehicle in which when the apparatus is disposed over the gearshift in the parked position a bracket on the apparatus will block removal of the radio from the motor vehicle.

A further object is to provide an apparatus for protecting a console gearshift and preventing theft of a radio in a motor vehicle that is simple and easy to use.

A still further object is to provide an apparatus for protecting a console gearshift and preventing theft of a radio in a motor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
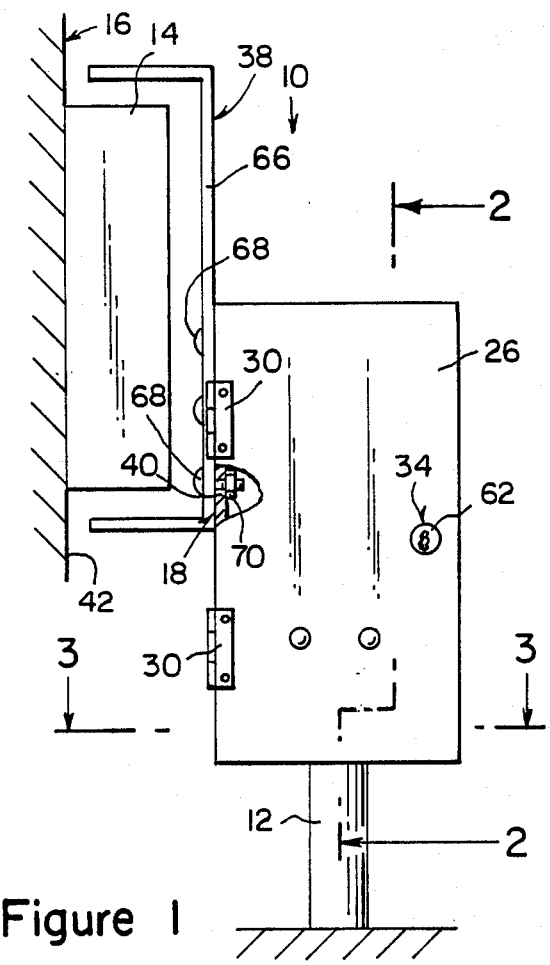
FIG. 1 is an elevational view of the invention installed on a console gearshift and blocking the motor vehicle radio.
Figure 2:
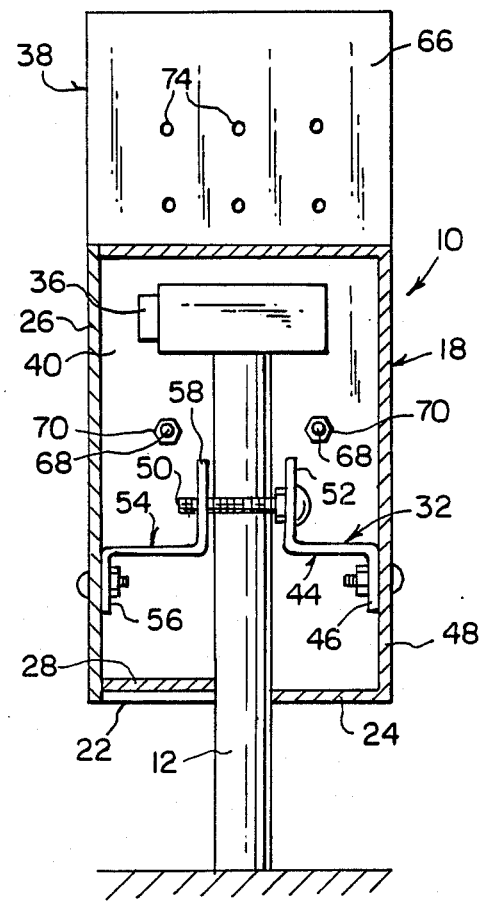
FIG. 2 is a vertical cross sectional view taken along line 2—2 in FIG. 1.
Figure 5:
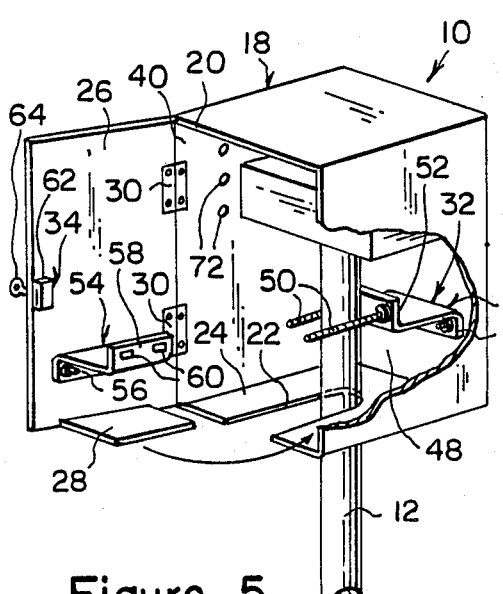
FIG. 5 is a perspective view of the invention with the bracket removed, the door open and the housing broken away to show the various components inside thereof.
Figure 4:
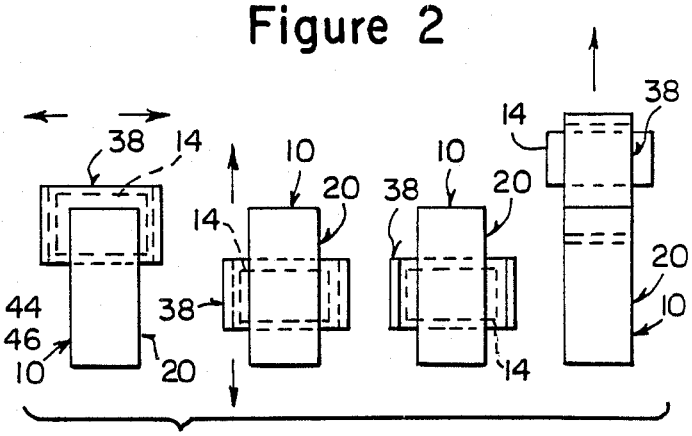
FIG. 4 is a series of diagrammatic views showing various positions of the bracket with relationship to the motor vehicle radio.
Figure 3:
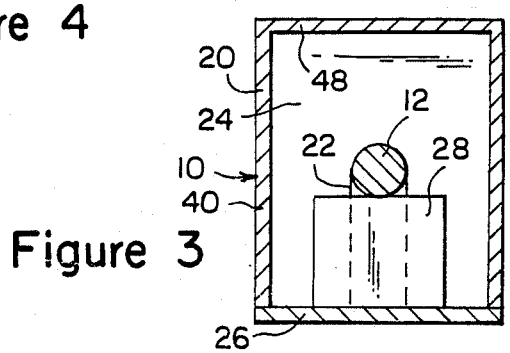
FIG. 3 is a horizontal cross sectional view taken along line 3—3 in FIG. 1.

Turning now descriptively to the drawings, in which similar reference characters denote similar elements throughout the several views, the figures illustrate an apparatus 10 for protecting a console gearshift 12 and preventing theft of a radio 14 in a motor vehicle 16. The apparatus 10 consists of a housing 18 having an open front wall 20 and a slot 22 in bottom wall 24. The housing 18 is of a predetermined size to fit over the console gearshift 12. A door 26 having an inwardly facing bottom plate 28 is provided. The door 26 is hinged at 30 along one side of the open front wall 20 so that when the door 26 is closed the bottom plate 28 will cover the slot 22 in the bottom wall 24. A structure 32, best seen in FIGS. 2 and 5 is for holding the housing 18 in a stabilized position with respect to the console gearshift 12 when the door 26 is closed. Another structure 34 is for securing the door 26 in a locked position to the housing 18 when the door 26 is closed so that button 36 on the console gearshift 12 cannot be depressed to release the console gearshift out of a parked position, thus preventing an unauthorized person (not shown) from driving the motor vehicle 16 away. And finally, a third structure 38 is mounted to side wall 40 of the housing 18 for blocking the radio 14 so as to prevent an unauthorized removal of the radio 14 from dashboard 42 of the motor vehicle 16.

The stabilizing structure 32 includes a first Z-shaped bracket 44 having a first leg 46 mounted to interior of rear wall 48 of the housing 18. A pair of spaced apart rods 50 are mounted to second leg 52 of the first Z-shaped bracket 44 so as to extend inwardly into the housing 18 on both sides of the console gearshift 12. A second Z-shaped bracket 54 has a first leg 56 mounted to interior of the door 26 and a second leg 58 having a pair of spaced apart holes 60 so that when the door 26 is closed distal ends of the rods 50 will enter the holes for stabilizing the housing 18.

The securing structure 34 includes a lock 62 mounted onto the door 26 and a key 64 for operating the lock 62. The blocking structure 38 is a C-shaped bracket 66 adjustably mounted to the side wall 40 of the housing via bolts 68, nuts 70, a series of apertures 72 in the side wall 40 and a series of aperture 74 in the bracket 66 so that the C-shaped bracket 66 can be properly positioned for blocking the radio 14.

LIST OF REFERENCE NUMBERS 10 apparatus
12 console gearshift
14 radio
16 motor vehicle
18 housing
20 open front wall
22 slot
24 bottom wall
26 door
28 inwardly facing bottom plate
30 hinge
32 stabilizing structure
34 securing structure
36 button
38 blocking structure 40 side wall
42 dashboard
44 first Z-shaped bracket
46 first leg of first Z-shaped bracket
48 rear wall
50 rod
52 second leg of first Z-shaped bracket
54 second Z-shaped bracket
56 first leg of second Z-shaped bracket
58 second leg of second Z-shaped bracket
60 hole
62 lock
64 key
66 C-shaped bracket
68 bolt
70 nut
72 aperture It will be understood that each of the elements described above, or two or more together, may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for protecting a console gearshift and preventing theft of a radio in a motor vehicle, said apparatus comprising:
   (a) a housing having an open front wall and a slot in bottom wall, said housing being of a predetermined size to fitover the console gearshift;
   (b) a door having an inwardly facing bottom plate, said door being hinged along one side of said open front wall so that when said door is closed said bottom plate will cover said slot in said bottom wall;
   (c) means for holding said housing in a stabilized position with respect to said console gearshift when said door is closed;
   (d) means for securing said door in a locked position to said housing when said door is closed so that button on the console gearshift cannot be depressed to release the console gearshift out of a parked position, thus preventing an unauthorized person from driving the motor vehicle away; and
   (e) means mounted to side wall of said housing for blocking the radio so as to prevent an unauthorized removal of the radio from the motor vehicle.

2. An apparatus as recited in claim 1, wherein said stabilizing means includes:
   (a) a first Z-shaped bracket having a first leg mounted to interior of rear wall of said housing;
   (b) a pair of spaced apart rods mounted to second leg of said first Z-shaped bracket so as to extend inwardly into said housing on both sides of said console gearshift; and
   (c) a second Z-shaped bracket having a first leg mounted to interior of said door and a second leg having a pair of spaced apart holes so that when said door is closed distal ends of said rods will enter said holes for stabilizing said housing.

3. An apparatus as recited in claim 2, wherein said securing means includes:
   (a) a lock mounted onto said door; and
   (b) a key for operating said lock.

4. An apparatus as recited in claim 3, wherein said blocking means is a C-shaped bracket adjustably mounted to the side wall of said housing so as to be properly positioned for blocking the radio.

* * * * *